Patented Aug. 9, 1938

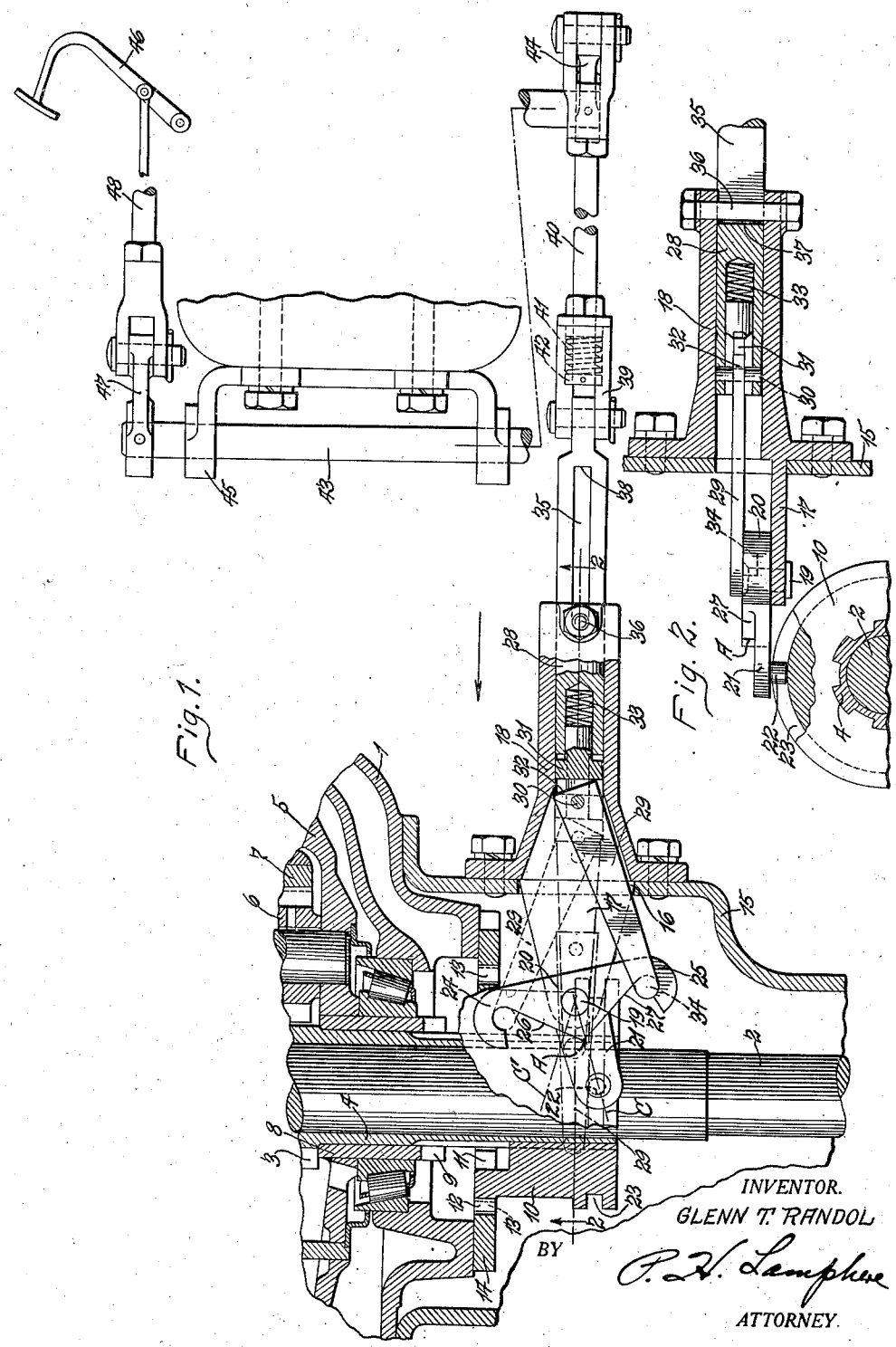

2,126,033

UNITED STATES PATENT OFFICE 2,126,033

CONTROL MECHANISM FOR AUTOMOBILE TRANSMISSIONS

Glenn T. Randol, Cape Girardeau, Mo.

Application March 27, 1936, Serial No. 71,133

7 Claims. (Cl. 192—82)

This invention relates to control mechanism and more particularly to control mechanism for moving a shiftable member of a change speed transmission.

One of the objects of my invention is to provide a simple and efficient mechanism for alternately moving a shiftable member to two different positions by means of a reciprocable member.

Another object of my invention is to provide a control mechanism for shifting a speed controlling element of a change speed transmission to two different positions by means of a longitudinally movable element, said mechanism being so arranged that when the longitudinally movable member is reciprocated to move the speed controlling element to one position, the mechanism will be automatically set so that a subsequent reciprocation of said member will move the speed controlling element to its other position.

A further object of my invention is to provide mechanism whereby a shiftable element of a change speed transmission may be alternately shifted in opposite directions to two different positions by means of a direct pulling force.

A more specific object of my invention is to shift an element of a change speed transmission in opposite directions to two different positions by means of an oscillating member and a reciprocable member which is so arranged that the reciprocable member can be alternately connected to said oscillating member on opposite sides of its pivotal axis by successive reciprocations of the reciprocable member.

Other objects of my invention will become apparent from the following description taken in connection with the accompanying drawing in which Figure 1 is a partial cross-sectional view of my novel control mechanism associated with a two speed axle for shifting the slidable clutch element thereof alternately to its two operative positions; Figure 2 is a partial cross-sectional view taken on the line 2—2 of Figure 1.

Although I have selected a two speed axle to disclose how my novel control mechanism operates, it is to be understood that it may be employed in any place where it is desired to alternately move a shiftable member in opposite directions to two different positions.

Referring to the drawing in detail, the numeral 1 indicates a rear axle housing of conventional construction in which is positioned a rear axle 2 which is connected to the vehicle wheels and is adapted to be driven by means of the usual propeller shaft (not shown) from the engine of the vehicle, there being interposed between this propeller shaft and the axle a change speed gearing whereby the driving ratio between the propeller shaft and the axle may be changed when desired. This change speed gearing with which I have chosen to associate my control mechanism is of the common planetary type and is only partially shown in order to disclose the necessary elements which are acted upon by the control mechanism. The axle 2 rotatably carries the sun gear 3 which has integral therewith an elongated splined sleeve 4. The carrier of the gearing is shown at 5 and upon this is carried the planet gears 6 which cooperate with the sun gear and the orbit gear 7 connected to the usual differential gearing (not shown). The carrier 5 is driven directly by the propeller shaft from the engine and is provided with a sleeve 8 rotatably mounted upon the splined sleeve 4 and having integrally associated with its end clutch teeth 9. A slidable clutch member 10 is splined on the outer end of the sleeve 4 and has internal clutch teeth 11 for cooperation with the clutch teeth 9 and external clutch teeth 12 for cooperation with clutch teeth 13 carried by a fixed member 14 mounted on the housing 1.

When the clutch member 10 is moved to engage the clutch teeth 12 and 13, the sun gear is held stationary and a predetermined speed ratio is established between the propeller shaft and the axle. When the clutch member 10 is moved to a position to disengage the clutch teeth 12 and 13 and engage the clutch teeth 9 and 11, the sun gear is locked to the carrier and another speed ratio is established between the propeller shaft and the axle. It is thus seen that the speed ratios of the two speed axle may be selected as desired by moving the clutch 10 in opposite directions.

In accordance with my invention, I have designed new and novel means for alternately shifting the clutch member 10 to its two different positions. The housing 15, which is an extension of the housing 1, is formed with a suitable opening 16 into which extends a supporting arm 17 integrally carried by a guiding housing 18 bolted to the axle housing 15 in the manner shown. This supporting arm extends to a position adjacent the slidable clutch member 10 and has pivotally mounted thereon an oscillating member 20 by means of a pivot pin 19. The oscillating member is T-shaped and the leg 21 thereof is provided with a suitable pin 22 for cooperation with the annular groove 23 in the clutch member 10 for establishing a connection between the oscillating member and the clutch member. The oppositely extending arms 24 and 25 of the oscillating member have hooked ends, as shown, and are provided with suitable cam surfaces 26 and 27 arranged in converging relation in order to form an apex "A" positioned on the center line "C" of the oscillating T-shaped member, i. e., the line drawn through the pin 22 and the pivotal axis of the oscillating member.

The guiding housing 18 has reciprocably mounted therein a rod 28 provided at its inner end with a horizontal slot for reception of a finger member 29. This finger is pivoted in the slot by means of a pin 30 whereby it can have free horizontal swinging movement in opposite directions. The finger is yieldably maintained in aligned position with respect to the rod by a flat-headed plunger 31 engaging the flat end 32 of the finger, the plunger being biased by a suitable coil spring 33. The finger 29 extends into the axle housing in an overlying position with respect to the oscillating member in the manner shown and the inner end of the finger has a projection 34 adapted to cooperate with the oppositely extending arms 24 and 25 of the oscillating member.

I prefer to reciprocate the slidable rod 28 by means of the usual clutch pedal found upon the motor vehicle but it is understood that it may be reciprocated by any manual member if such is desired. The rod is formed with an elongated slot 35 for reception of a pin or bolt 36 carried by the end of the housing 18 in order to prevent the rod from turning and to provide abutments by means of the ends 37 and 38 of the slot for limiting the extent of reciprocation of the rod 28. The rod carries at its outer end a suitable clevis 39 for connecting it to another rod 40 and a suitable yieldable lost motion connection is provided between the clevis 39 and the rod 40 by means of a coil spring 41 interposed between the clevis and abutment 42 on the rod 40. The rod 40 is in turn connected to a cross-shaft 43 by means of a lever 44, the cross-shaft being journaled in a suitable bracket 45 secured to any fixed portion of the vehicle, as, for example, the universal joint housing or the transmission housing. The cross-shaft is adapted to be actuated by the main clutch pedal 46 of the vehicle, the connection comprising a lever 47 on the cross-shaft and a connecting rod 48.

Referring to the operation of my novel control mechanism, the main clutch pedal 46 is shown in its extreme depressed position wherein the reciprocable rod 28 has been actuated to move the oscillating member to place teeth 12 and 13 in engagement. The normal position of the reciprocable rod 28, when the clutch pedal is in clutch engaged position (not depressed), is such that the finger 29 lies in its extreme rearward position in alignment with the rod as shown in dashed lines. The oscillating member 20 under these conditions may be in the position shown where the clutch element 10 is in a position to engage clutch teeth 12 and 13, or it may be in its other position (indicated by center line "C'") where the clutch element 10 is in a position to engage the clutch teeth 9 and 11.

Assuming that the member 20 is in the position shown in full in Figure 1, the apex "A" of the cam surfaces 26 and 27 will lie to the left side of the axis of the reciprocable rod 28 as viewed in the direction of the arrow. If with the reciprocable rod 28 in its normal position and pedal 46 not depressed it is desired to shift the clutch member 10 to the right (upwardly in Figure 1) to disengage the clutch teeth 12 and 13 and engage the clutch teeth 9 and 11 to establish the other speed ratio, the clutch pedal 46 is depressed. Due to the fact that the end of the finger that carries the projection 34 is positioned some distance to the rear of the cam surfaces 26 and 27 of the oscillating member, the first movement of the rod 28 (to the right in Figure 1) by the clutch pedal will have no affect upon the control mechanism. This lost motion connection is desirable when the main clutch pedal is employed as the manual member for actuating the control mechanism as it permits the main clutch of the vehicle to be disengaged to free the wheels from the engine. When this main clutch has been disengaged by pedal 46, the rod 28 has been moved sufficiently to cause the projection 34 on the finger 29 to engage the cam surface 26 which lies in its path of travel due to the position of the oscillating member. Continued movement of the rod 28 results in the projection 34 sliding along the surface 26 until it engages the hooked end of the arm 24 (shown in dashed line), this sliding movement being permitted by the pivotal connecting of the finger and rod. Further movement of the clutch pedal to move the rod 28 will now cause the arm 24 to swing the oscillating member about its pivot. This results in the leg 21 being swung clockwise carrying with it the clutch member 10, thereby disengaging the clutch teeth 12 and 13 and engaging the clutch teeth 9 and 11.

When the clutch pedal is released, the finger 29 will be brought back into alignment with the reciprocable rod 28 by the spring biased plunger 31 and the finger and rod will assume their normal position. The oscillating member is now in a position where the apex "A" of the cam surfaces 26 and 27 is on the right-hand side of the axis of the reciprocable rod and the cam surface 27 lies in the path of travel of the projection 34. If it is now desired to change the speed ratio back to the position shown in full line in Figure 1, the clutch pedal will be depressed and the rod 28 reciprocated. The movement of the rod results in the projection 34 on the finger 29 engaging the cam surface 27 and sliding there along until it engages the hooked end of the arm 25. Further movement of the rod will cause the oscillating member to be shifted to the left to assume the position shown in Figure 1. Upon release of the clutch pedal, finger 29 will be brought back into alignment with the rod 28 by the plunger 32 when the rod assumes its normal position in readiness, again shifting the oscillating member when the clutch pedal is depressed.

The end 37 of the slot, which is adapted to abut the bolt 36, prevents the moving of the mechanism beyond a point other than that desired to engage the proper clutch teeth. If, with the mechanism shown, the operator does not desire to change the speed ratio of the two spaced axle each time the main clutch pedal is depressed, he need only depress the pedal sufficiently to establish engagement between the presented cam surfaces and the projection 34, this engagement offering a resistance to the movement of the clutch pedal sufficiently to warn the operator that further movement of the pedal will result in a change of the speed ratio.

The purpose of the yieldable connection between the rod 41 and the clevis 39 is to permit slight excess of movement of a control linkage after the end 37 of the slot has contacted the pin 36 to warn the operator that the shift has been made. It also prevents damage to the shifting mechanism which may be caused by a too forceful depression of the clutch pedal.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a control mechanism for shifting a slidable element of a change speed gearing in opposite directions to two different positions, a support adjacent the slidable element, a member pivoted to the support and connected to the slidable element, a longitudinally reciprocable member, a finger pivoted to the reciprocable member, cooperating means on opposite sides of the pivotal axis of the pivoted member and on the finger for connecting the two together whereby the pivoted member may be rotated in opposite directions by the movement of the reciprocable member away from said pivoted member, and cooperating means on the pivoted member and the finger and controlled by the position of the pivoted member for causing said finger to be alternately connected to the opposite sides of the pivoted member when the reciprocable member is successively reciprocated to move the pivoted member.

2. In a control mechanism for shifting a slidable element of a change speed transmission in opposite directions to two different positions, a support adjacent the slidable element, a member pivoted to the support and connected to the slidable element and having arms on opposite sides of its pivotal axis, a rod having its axis positioned at right angles to the pivotal axis of the pivoted member, a guide for the rod, a finger pivoted to the rod and adapted for cooperation with either arm to move the pivoted member in opposite directions, yieldable means for normally maintaining the finger aligned with the rod, and means carried by the pivoted member and adapted to assume a position on one side of the longitudinal axis of the rod to cause the finger to cooperate with one arm when the pivoted member is in one position and the reciprocable member is moved away from said pivoted member and adapted to assume a position on the other side of the longitudinal axis of the rod to cause the finger to cooperate with the other arm when the pivoted member is in its other position and the reciprocable member is moved away from said pivoted member.

3. In a control mechanism for shifting a slidable element of a change speed transmission in opposite directions to two different positions, the combination of a transmission casing having an opening, a guiding member secured to the casing and having a supporting arm projecting into the casing adjacent the slidable element, a member pivoted to the supporting arm and connected to the slidable element, a rod slidable in the guiding member, and means for alternately connecting the rod to said pivoted member on opposite sides of its pivotal axis and rotating the pivoted member in opposite directions by successive reciprocations of the rod.

4. In a control mechanism for shifting a slidable element of a change speed transmission in opposite directions to two different positions, the combination of a transmission casing having an opening, a guiding member secured to the casing and having a supporting arm projecting into the casing adjacent the slidable element, a member pivoted to the supporting arm and connected to the slidable element, a rod slidable in the guiding member, means for alternately connecting the rod to said pivoted member on opposite sides of its pivotal axis and rotating the pivoted member in opposite directions by successive reciprocations of the rod, and means carried by the guiding member and cooperating with the rod by limiting its reciprocatory travel.

5. In a vehicle control mechanism for shifting a slidable element of a change speed transmission in opposite directions to two different positions, a main vehicle clutch pedal, a support, a member pivoted to the support and connected to the slidable element, a longitudinally reciprocable member, connecting means for reciprocating said member by the clutch pedal, means for alternately connecting said longitudinally reciprocable member to said pivoted member on opposite sides of its pivotal axis and rotating the pivoted member in opposite directions by successive reciprocations of said reciprocable member by the clutch pedal, and means permitting said clutch pedal to have sufficient movement to disengage the main clutch prior to movement of the pivoted member by the reciprocable member.

6. In a vehicle control mechanism for shifting a slidable element of a change speed transmission in opposite directions to two different positions, a main vehicle clutch pedal, a transmission casing having an opening, a guiding member secured to the casing and having a supporting arm projecting into the casing adjacent the slidable element, a member pivoted to the supporting arm and connected to the slidable element, a rod slidable in the guiding member and connected to the clutch pedal, means for alternately connecting the rod to said pivoted member on opposite sides of its pivotal axis and rotating the pivoted member in opposite directions by successive reciprocations of the rod by the clutch pedal, and means permitting said rod to have a predetermined free movement prior to the establishment of a connection between it and the pivoted member to allow sufficient clutch pedal movement to disengage the main clutch.

7. In a control mechanism for shifting a slidable element of a change speed transmission in opposite directions to two different positions, the combination of a transmission casing having an opening, a guiding member secured to the casing and having a supporting arm projecting into the casing adjacent the slidable element, a member pivoted to the supporting arm and having a portion connected to the slidable element and two arms on opposite sides of its pivotal axis, a rod slidable in the guiding member, a finger pivoted to the rod and adapted to cooperate with either of said oppositely extending arms of the pivoted member, and means carried by the pivoted member and cooperating with the finger for causing said finger to engage one of the arms when the pivoted member is in one position and the rod is reciprocated and to engage the other arm when the pivoted member is in another position and the rod is reciprocated.

GLENN T. RANDOL.